United States Patent
Coppola et al.

(10) Patent No.: US 10,794,419 B2
(45) Date of Patent: Oct. 6, 2020

(54) COMPOSITE CONNECTING RODS

(71) Applicant: GM GLOBAL TECHNOLOGY OPERATIONS LLC, Detroit, MI (US)

(72) Inventors: Anthony M. Coppola, Rochester Hills, MI (US); Hamid G. Kia, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 393 days.

(21) Appl. No.: 15/659,237

(22) Filed: Jul. 25, 2017

(65) Prior Publication Data
US 2019/0032700 A1    Jan. 31, 2019

(51) Int. Cl.
| | |
|---|---|
| *F16C 7/02* | (2006.01) |
| *B29C 70/02* | (2006.01) |
| *B29C 70/48* | (2006.01) |
| *B29C 70/86* | (2006.01) |
| *B29C 64/106* | (2017.01) |
| *B33Y 10/00* | (2015.01) |
| *B29C 33/00* | (2006.01) |

(52) U.S. Cl.
CPC ............ *F16C 7/026* (2013.01); *B29C 64/106* (2017.08); *B29C 70/023* (2013.01); *B29C 70/48* (2013.01); *B29C 70/86* (2013.01); *B33Y 10/00* (2014.12); *B29C 33/0022* (2013.01); *F16C 2360/22* (2013.01)

(58) Field of Classification Search
USPC ......... 123/197.3, 197.4; 29/888.09–888.092; 74/579, 581
See application file for complete search history.

(56) References Cited

U.S. PATENT DOCUMENTS

| | | | | |
|---|---|---|---|---|
| 2,322,771 | A * | 6/1943 | Palm ...................... | F16C 33/28 |
| | | | | 442/91 |
| 4,266,596 | A * | 5/1981 | Ban ..................... | B22D 19/0027 |
| | | | | 164/108 |
| 4,329,915 | A * | 5/1982 | Schulz .................. | F02F 7/0085 |
| | | | | 29/888.046 |
| 4,353,267 | A | 10/1982 | Robert | |

(Continued)

FOREIGN PATENT DOCUMENTS

| | | | | |
|---|---|---|---|---|
| CH | | 652176 A5 * | 10/1985 | .............. F16C 7/026 |
| CN | | 1932315 A | 3/2007 | |

(Continued)

OTHER PUBLICATIONS

Sherman; "Lamborghini is Forging Ahead with Forged Carbon Fiber; We Visit Their U.S.-Based Lab"; Car and Driver; Jun. 22, 2016.

*Primary Examiner* — George C Jin
*Assistant Examiner* — Teuta B Holbrook
(74) *Attorney, Agent, or Firm* — Quinn IP Law

(57) ABSTRACT

A connecting rod includes a shank extending along a shank axis and a first end portion coupled to the shank. The first end portion has an annular shape. The connecting rod also includes a second end portion coupled to the shank. The second end portion has an annular shape. Each of the shank, the first end portion, and the second end portions includes a fiber-reinforced composite. The fiber-reinforced composite includes a matrix and a plurality of fibers embedded in the matrix. At least one of the shank fibers is elongated along the shank axis.

13 Claims, 6 Drawing Sheets

(56) References Cited

U.S. PATENT DOCUMENTS

| | | | | |
|---|---|---|---|---|
| 4,403,525 A * | 9/1983 | Bongers | ............... | F16C 7/026 |
| | | | | 74/579 E |
| 4,406,558 A * | 9/1983 | Kochendorfer | ............ | F16J 1/16 |
| | | | | 29/888.05 |
| 4,414,860 A * | 11/1983 | Brunsch | ............... | F16C 7/026 |
| | | | | 74/579 E |
| 4,425,820 A * | 1/1984 | Swozil | ............... | F16C 7/026 |
| | | | | 74/579 E |
| 4,534,400 A * | 8/1985 | Ban | ............... | B22D 17/00 |
| | | | | 164/108 |
| 4,546,669 A * | 10/1985 | Fischer | ............... | F16C 7/026 |
| | | | | 123/197.3 |
| 4,572,058 A * | 2/1986 | Hinz | ............... | F16J 1/16 |
| | | | | 123/193.6 |
| 4,572,271 A * | 2/1986 | Nakashima | ............ | B22D 19/02 |
| | | | | 164/97 |
| 4,606,395 A * | 8/1986 | Ban | ............... | B22D 18/02 |
| | | | | 164/120 |
| 4,805,483 A * | 2/1989 | Beckmann | ............ | F16C 7/026 |
| | | | | 384/268 |
| 6,036,904 A * | 3/2000 | Fantino | ............ | B29C 70/202 |
| | | | | 264/102 |
| 6,209,279 B1 * | 4/2001 | Meier | ............... | E04B 1/41 |
| | | | | 52/223.14 |
| 6,221,795 B1 * | 4/2001 | Sikorski | ............ | B29C 70/025 |
| | | | | 442/19 |
| 6,500,515 B1 * | 12/2002 | Fantino | ............ | B29C 70/202 |
| | | | | 428/105 |
| 2007/0264470 A1 * | 11/2007 | Wellman | ............ | B32B 27/306 |
| | | | | 428/105 |
| 2015/0292550 A1 * | 10/2015 | Streckel | ............... | F16C 7/026 |
| | | | | 74/579 E |
| 2016/0208367 A1 * | 7/2016 | Miller | ............... | B22D 25/06 |
| 2018/0128307 A1 * | 5/2018 | Ueda | ............ | F16C 9/04 |
| 2018/0156264 A1 * | 6/2018 | Ueda | ............ | F16C 33/122 |

FOREIGN PATENT DOCUMENTS

| | | | | |
|---|---|---|---|---|
| DE | 3248373 A1 * | 7/1984 | ............ | B22D 19/14 |
| EP | 0032162 A1 * | 7/1981 | ............... | F16C 7/00 |
| EP | 0137261 A2 * | 8/1984 | ............ | B22D 19/14 |
| JP | S5891919 A | 6/1983 | | |
| JP | 59050218 A * | 3/1984 | ............... | F16C 7/02 |
| JP | 59077117 A * | 5/1984 | ............... | F16C 7/02 |
| JP | S5977117 A | 5/1984 | | |
| JP | S59121220 A | 7/1984 | | |
| JP | 60084419 A * | 5/1985 | ............... | F16C 7/02 |
| WO | WO-8604122 A1 * | 7/1986 | ............... | F16C 7/02 |

\* cited by examiner

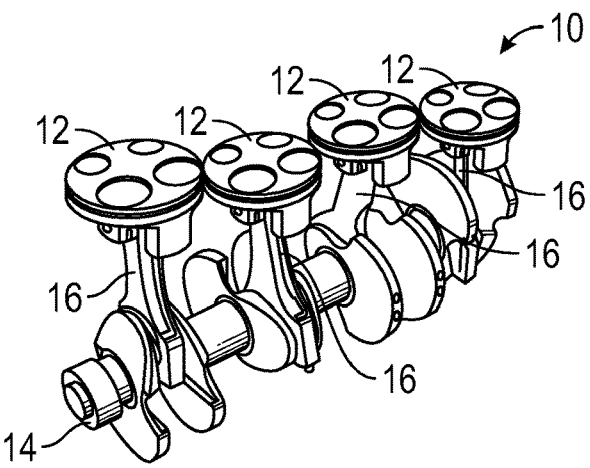
FIG. 1
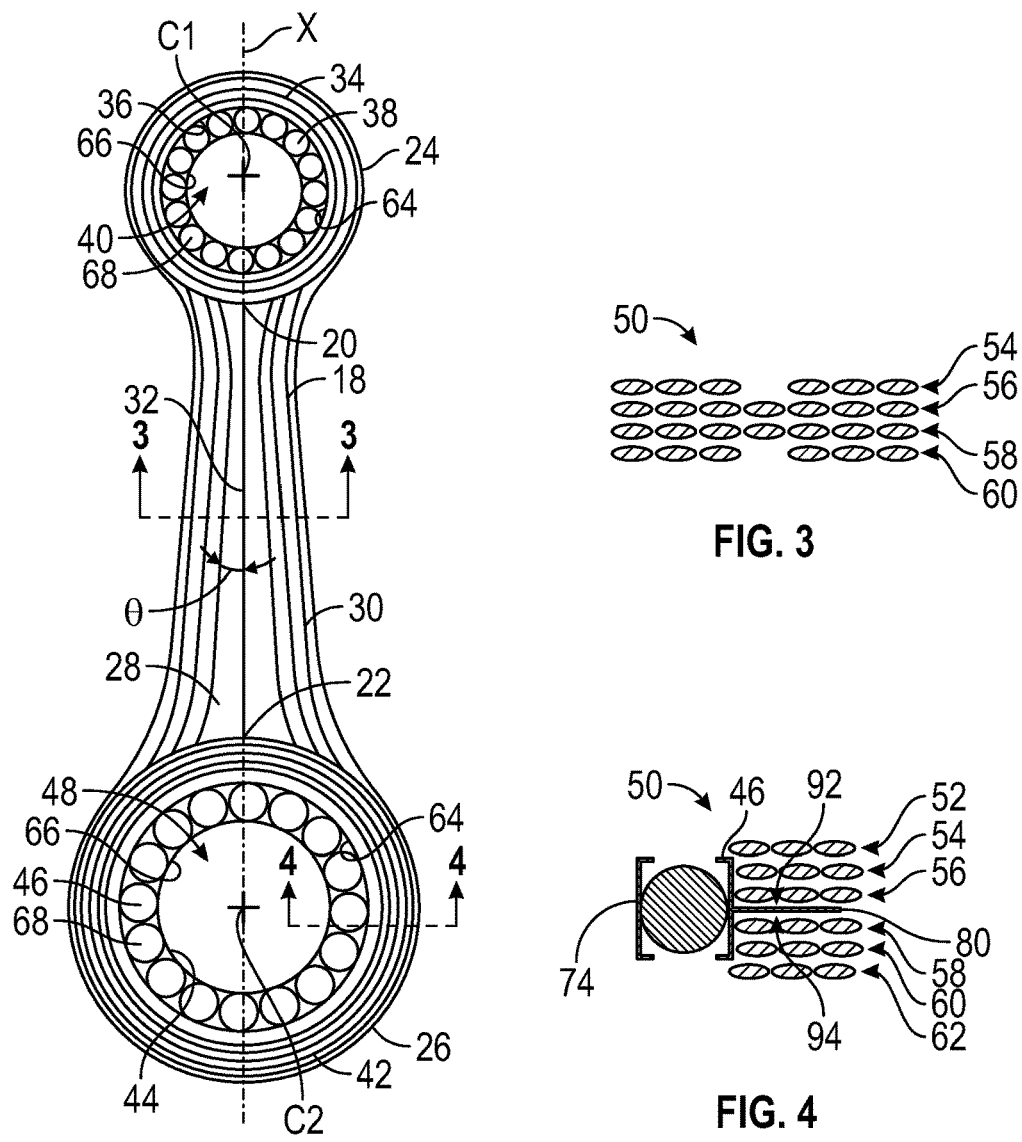
FIG. 2
FIG. 3
FIG. 4

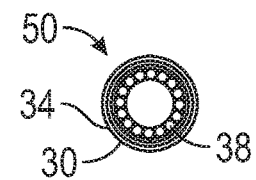
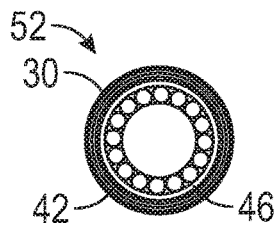
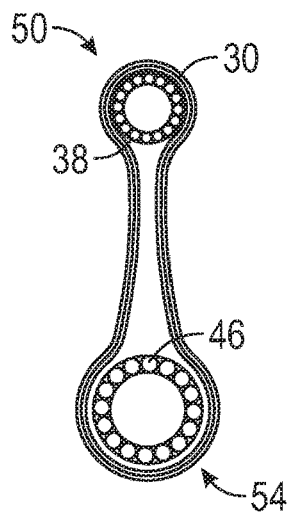
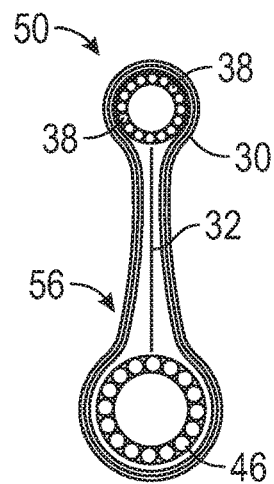
FIG. 5　　　FIG. 6　　　FIG. 7
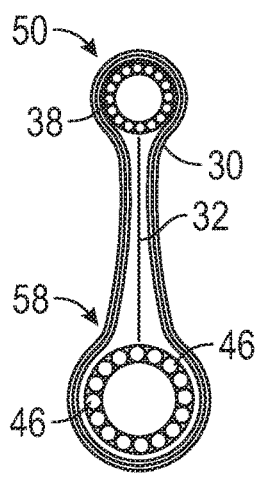
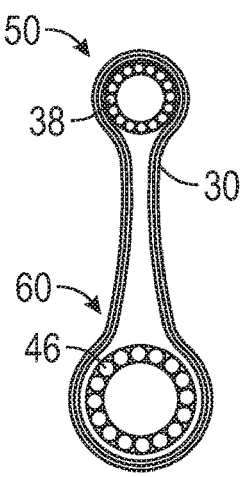
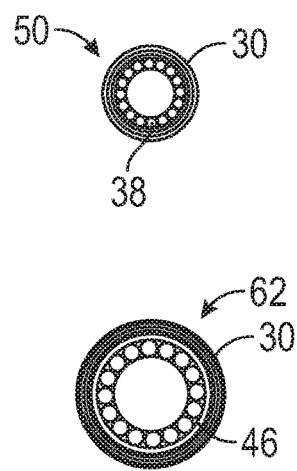
FIG. 8　　　FIG. 9　　　FIG. 10
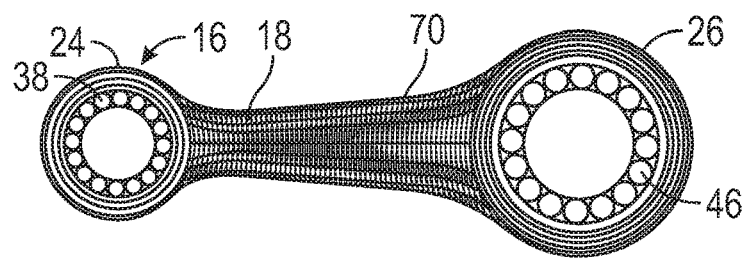
FIG. 11

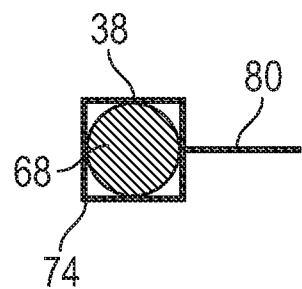 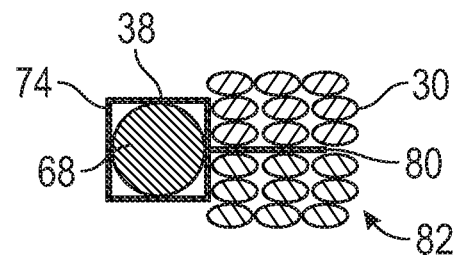
FIG. 28   FIG. 29
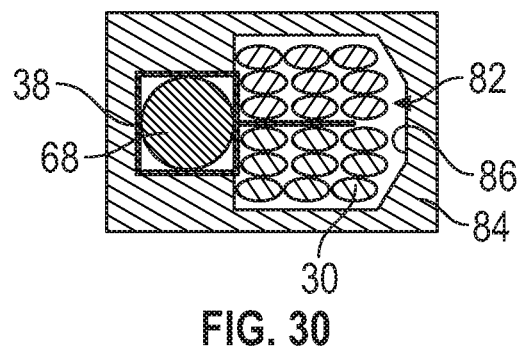 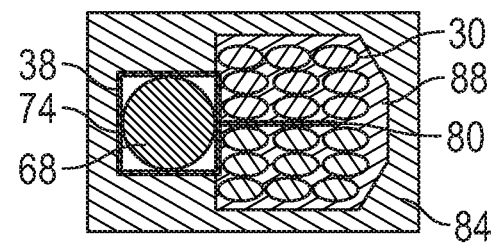
FIG. 30   FIG. 31
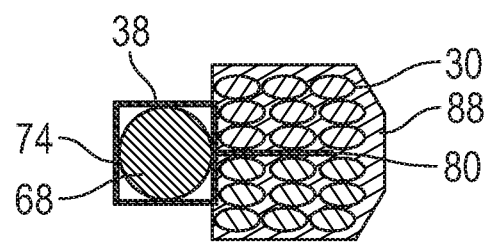
FIG. 32

COMPOSITE CONNECTING RODS

INTRODUCTION

The present disclosure relates to composite connecting rods for use in an internal combustion engine.

Some internal combustion engines include a crankshaft, a plurality of pistons, and a plurality of connecting rods. Each of the connecting rods connects one of the pistons with the crankshaft.

SUMMARY

The presently disclosed methods allow for control of fiber orientation to produce a composite connecting rod with an optimal fiber architecture. Composites have excellent mechanical performance. Controlling fiber orientations enables optimal structures that fully utilize the anisotropic properties of the composite. The methods for controlling the fiber placement and orientation are usable for large volume productions.

A connecting rod includes a shank extending along a shank axis and a first end portion coupled to the shank. The first end portion has an annular shape. The connecting rod also includes a second end portion coupled to the shank. The second end portion has an annular shape. Each of the shank, the first end portion, and the second end portion includes a fiber-reinforced composite. The fiber-reinforced composite includes a matrix and a plurality of fibers embedded in the matrix. The fibers include shank fibers disposed in the shank. At least one of the shank fibers is elongated along the shank axis. At least one of the shank fibers is oriented at a shank fiber angle relative to the shank axis. The shank fiber angle is between zero degrees and twenty-five degrees. The fibers include first-end fibers that extend annularly within the first end portion. The first end portion defines a first inner surface, the first inner surface has an annular shape, the first inner surface has a first circumference, and at least one of the first-end fibers entirely and continuously surrounds an entirety of the first circumference of the first inner surface. The connecting rod further includes a first bearing, wherein the first inner surface defines a first cavity, and the first cavity receives the first bearing. The fibers include second-end fibers that extend annularly within the second end portion. The second end portion defines a second inner surface. The second inner surface has an annular shape. The second inner surface has a second circumference, and at least one of the second-end fibers entirely and continuously surrounds an entirety of the second circumference of the second inner surface. The connecting rod further includes a second bearing, wherein the second inner surface defines a second cavity, and the second cavity receives the second bearing. The second cavity is larger than the first cavity. The second circumference is greater than the first circumference. The connecting rod may further include over-braiding surrounding the shank. The connecting rod further includes a plurality of layers. Each of the layers includes the fibers such that the fibers are stacked together. The layers include a first outermost layer, a second outermost layer opposite the first outermost layer, and a plurality of intermediate layers disposed between the first outermost layer and the second outermost layer, the second bearing includes an outer race, an inner race, and a plurality of rollers disposed between the outer race and the inner race. The first outermost layer and the second outermost layer are closer to the inner race than the intermediate layers, thereby overlapping the second bearing to lock the second bearing in place. The connecting rod may include journal bearings coupled to the first end portion and/or the second end portion. The connecting rod may have a split bearing design in either the first end portion or the second end portion. In the split bearing design, the fibers are oriented to form a flange with a resin rich line. Then, the annular bearing is split under mechanical stress.

A method of manufacturing a connecting rod includes placing a plurality of fibers in a predetermined arrangement and adding a resin to the plurality of fibers to connect the fibers together and form at least a portion of the connecting rod. Placing the plurality of fibers in the predetermined arrangement may include using a tailored fiber placement process. The tailored fiber placement process includes placing fibers around a first bearing and around a second bearing such that the fibers completely surround the first bearing and the second bearing. The tailored fiber placement process includes placing fibers between the first bearing and the second bearing. The method may further include forming a first half of the connecting rod and a second half of the connecting rod by placing the fibers in the predetermined arrangement. Specifically, the dry halves are assembled together with the bearings and then the resin is infused. In other words, a first bearing and a second bearing are sandwiched with the first half of the connecting rod and the second half of the connecting rod to assemble the connecting rod. Then, the resin is infused to the first half of the connecting rod and the second half of the connecting rod Placing the fibers in the predetermined arrangement and adding the resin may be performed using a 3D printing process. Placing the fibers in the predetermined arrangement may include wrapping fibers around two mandrels.

The method may include filing a bearing with removable material. Placing the fibers in the predetermined arrangement may include placing the fibers along a bearing to form a preform. The method may further include placing the preform in a mold. Adding the resin to the plurality of fibers includes infusing the preform with resin using a resin transfer molding process, and the resin transfer molding process includes transferring the resin into the mold to form a part. Next, the resin is solidified, such as by polymerization (often known as "curing"). The method further includes removing the part from the mold. The method further includes removing the removable material from the bearing to form the connecting rod.

Placing the fibers in the predetermined arrangement includes placing the fibers along the bearing to form a preform, wherein the bearing is a sealed bearing. The method may further include placing the preform in a mold. Adding the resin to the plurality of fibers includes infusing the preform with resin using a resin transfer molding process, and the resin transfer molding process includes transferring the resin into the mold to form a part. The method further includes removing the part from the mold.

The method of manufacturing of a connecting rod may entail placing a core material between the two halves. This core would function to add bending stiffness to the composite conrod. Alternatively, rather than use a core, a removable material is used to form a hollow section between the two halves. In either case, the removable material or the core is placed between the two halves in the shank section of the connecting rod. The core/removable-material could be completely or partially surrounded by fibers. The resin is then added and cured to form the composite. In the case of the removable material, the material is then removed to form a hollow region.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic isometric of a portion of an internal combustion engine, wherein the internal combustion engine includes at least one connecting rod.

FIG. 2 is a schematic front view of a connecting rod;

FIG. 3 is a schematic cross-sectional view of the connecting rod, taken along section line 3-3 of FIG. 2.

FIG. 4 is a schematic cross-sectional view of the connecting rod, taken along section line 4-4 of FIG. 2.

FIG. 5 is a schematic front view of a first layer of the connecting rod.

FIG. 6 is a schematic front view of a second layer of the connecting rod.

FIG. 7 is a schematic front view of a third layer of the connecting rod.

FIG. 8 is a schematic front view of a fourth layer of the connecting rod.

FIG. 9 is a schematic front view of a fifth layer of the connecting rod.

FIG. 10 is a schematic front view of a first layer of the connecting rod.

FIG. 11 is a schematic front view of a connecting rod including over-braiding.

FIG. 28 is a schematic cross-sectional front view of a bearing.

FIG. 29 is a schematic cross-sectional front view of the bearing, including the fibers.

FIG. 30 is a schematic cross-sectional front view of a preform, which includes the bearing and the fibers, in a mold.

FIG. 31 is a schematic cross-sectional front view, depicting resin being added to the preform to form a part.

FIG. 32 is a schematic cross-sectional front view of the part shown in FIG. 31 being removed from the mold.

DETAILED DESCRIPTION

Figure 12:
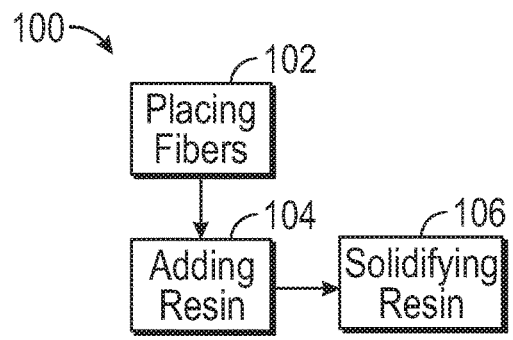
FIG. 12 is a flowchart of a method of manufacturing a connecting rod.

FIG. 1 schematically illustrates part of an internal combustion engine 10. The internal combustion engine 10 includes a plurality of pistons 12, a crankshaft 14, and a plurality of connecting rods 16. Each of the connecting rods 16 connects one of the pistons 12 to the crankshaft 14.

With reference to FIG. 2, the connecting rod 16 includes a shank 18 extending along a shank axis X. In other words, the shank 18 is elongated along the shank axis X. The shank 18 defines a first shank end 20 and a second shank end 22 opposite the first shank end 20. The second shank end 22 is spaced apart from the first shank end 20 along the shank axis X. The connecting rod 16 further includes a first end portion 24 coupled to the shank 18. The first end portion 24 has an annular shape and may be directly coupled to the first shank end 20 to enhance the structural integrity of the connecting rod 16. The connecting rod 16 further includes a second end portion 26 coupled to the shank 18. The second end portion 26 has an annular shape and may directly be coupled to the second shank end 22 to enhance the structural integrity of the connecting rod 16.

Each of the shank 18, the first end portion 24, and the second end portion 26 includes a fiber-reinforced composite. The fiber-reinforced composite includes a matrix 28 and a plurality of fibers 30 embedded in the matrix 28. The matrix 28 includes a resin. The resin may be wholly or partly made of thermosets, epoxies, phenolic, polyurethanes, polyesters, bis-maleimides (BMIs), polyimides, benzoxazines, thermoplastics, polyamides, polyethylene, polypropylene, ceramics, metals, or a combination thereof. The fibers 30 can be wholly or partly made of carbon, basalt, glass, or polymeric materials such as aramids, and ultra-high-molecular-weight polyethylene (UHMPE), or a combination thereof. The fibers 30 includes shank fibers 32 disposed in the shank 18. At least one of the shank fibers 32 is elongated along the shank axis X to optimally resist stresses experienced by the connecting rod 16. Most of the shank fibers 32 may be elongated along the shank axis X to optimally resist stresses experienced by the connecting rod 16. Accordingly, the shank fibers 32 may be referred to as axial fibers. At least one of the shank fibers 32 is oriented at a shank fiber angle θ relative to the shank axis, and the shank fiber angle θ is between zero degrees and twenty-five degrees to optimally resist stresses experienced by the connecting rod 16. In the depicted embodiment, most or all of the shank fibers 32 are oriented at a shank fiber angle θ relative to the shank axis that is between zero degrees and twenty-five degrees to optimally resist stresses experienced by the connecting rod 16. In other words, most or all of the fibers 30 in the shank 18 are oriented at a shank fiber angle θ relative to the shank axis that is between zero degrees and twenty-five degrees to optimally resist stresses experienced by the connecting rod 16.

The fibers 30 includes first-end fibers 34, which extend annularly within the first end portion 24 of the connecting rod 16. For this reason, the first-end fibers 34 may be referred to as the first annular fibers. The first end portion 24 defines a first inner surface 36. The first inner surface 36 has an annular shape. Therefore, the first inner surface 36 has a circumference (herein referred to as the first circumference). At least one of the first-end fibers 34 entirely and continuously surrounds an entirety of the first circumference of the first inner surface 36 to optimally resist stresses experienced by the connecting rod 16. For example, most of the first-end fibers 34 may entirely and continuously surrounds an entirety of the first circumference of the first inner surface 36 to optimally resist stresses experienced by the connecting rod 16. The connecting rod 16 further includes a first bearing 38. The first inner surface 36 defines a first cavity 40 that receives the first bearing 38. It is desirable to use bearings (as opposite to other bearings such as journal bearings) in order to minimize friction and avoid the need for a continuous steam of oil.

The fibers 30 further includes second-end fibers 42, which extend annularly within the second end portion 26. For this reason, the second-end fibers 42 may also be referred to as second annular fibers. The second end portion 26 defines a second inner surface 44 having an annular shape. The second inner surface 44 has a second circumference. At least one of the second-end fibers 42 entirely and continuously surrounds an entirety of the second circumference of the second inner surface 44 to optimally resist stresses experienced by the connecting rod 16. For example, most of the second-end fibers 42 entirely and continuously surrounds an entirety of the second circumference of the second inner surface 44 to optimally resist stresses experienced by the connecting rod 16. The connecting rod 16 further includes a second bearing 46. The second inner surface 44 defines a second cavity 48 that receives the second bearing 46. It is desirable to use bearings (as opposite to other bearings such as journal bearings) in order to minimize friction and avoid the need for a continuous steam of oil. The second cavity 48 is larger than the first cavity 40 because the first end portion 24 connects to the piston 12, and the second end portion 26 connects to the crankshaft 14. Accordingly, the circumference of the second inner surface 44 (i.e., the second circumference) is greater than the circumference of the first inner surface 36 (i.e., the second circumference). The shank axis X intersects the center C1 of the first cavity 40 and the center C2 of the second cavity 48. Each of the first bearing 38 and the second bearing 46 includes an outer race 64, an inner race 66, and a plurality of rollers 68 disposed between the outer race 64 and the inner race 66.

With reference to FIGS. 3-4, the connecting rod 16 includes a plurality of layers 50. Each of the layers 50 include the fibers 30. As such, fibers 30 are stacked together. As shown in FIG. 3, at the shank 18, for example, four layers 50 are stacked together. As shown in FIG. 4, at the second end portion 26 of the connecting rod 16, six layers 50 are stacked together. Six layers 50 may also be stacked together at the first end portion 24 of the connecting rod 16. Thus, each of the first end portion 24 and the second end portion 26 may include more layers 50 than the shank 18 to optimally resist stress experienced by the connecting rod 16. Overall, as a non-limiting example, the connecting rod 16 may include six layers 50, each including fibers 30, namely: the first layer 52 shown in FIG. 5; the second layer 54 shown in FIG. 6, the third layer 56 shown in FIG. 7, the fourth layer 58 shown in FIG. 8, the fifth layer 60 shown in FIG. 9, and the sixth layer 62 shown in FIG. 10. The first layer 52 may be referred to as the first outermost layer, and the sixth layer 62 may be referred to as the second outermost layer, which is opposite the first outermost layer. The second layer 54, the third layer 56, the fourth layer 58, and the fifth layer 60 may be referred to herein as the intermediate layers. Although the depicted embodiment illustrates six layers, it is contemplated that the connecting rod 16 may include more or fewer layers.

FIG. 4 is a cross-sectional view traversing the second bearing 46 and the second end portion 26. However, except for the dimension, the cross-section at the first bearing 38 and the first end portion 24 is identical to the cross-sectional view shown in FIG. 4. As shown in FIG. 4, the first layer 52 and the sixth layer 62 (i.e., the outermost layers) overlap the second bearing 46 to lock the second bearing 46 in place. In particular, the first layer 52 (i.e., the first outermost layer) and the sixth layer 62 (i.e., the second outermost layer) are closer to the inner race 66 of the second bearing 46 (and the first bearing 38) than the intermediate layers (i.e., the second layer 54, the third layer 56, the fourth layer 58, and the fifth layer 60), thereby overlapping the second bearing 46 (and the first bearing 38) to lock the second bearing 46 (and the first bearing 38) in place.

With reference to FIG. 11, the connecting rod 16 may further include over-braiding (or over-weaving) 70 in selected areas to add additional support. The over-braiding 70 strengthens the fibers 30. For example, the over-braiding 70 may surround the shank 18 to support the shank fibers 32, thereby enhancing fatigue performance.

With reference to FIG. 12, the present disclosure also describes methods of manufacturing the connecting rod 16. Generally, the methods 100 includes placing a plurality of fibers 30 in a predetermined arrangement (i.e., block 102), and then adding a resin to the plurality of fibers 30 to connect the fibers together and form at least a portion of the connecting rod 16 (block 104). Then, at block 106, the resin is solidified by, for example, polymerization. The fibers 30 may be placed in the predetermined arrangement by using a tailored fiber placement (TFP) process as shown in FIGS. 5-10. The TFP process is used to create the fiber preform. In addition, the TFP process is highly controllable, thereby minimizing fiber waste. During the TFP process, the fibers 30 are oriented inline with principal stresses to optimally resist stresses experienced by the connecting rod 16. As shown in FIGS. 5-10, in the TFP process, the fibers 30 are directly placed around the first bearing 38 and the second bearing 46. It is contemplated that the first bearing 38 and the second bearing 46 may be integrated with an assembled crankshaft.

With reference to FIGS. 5-10, the TFP process includes placing the fibers 30 (i.e., the first-end fibers 34) directly around the first bearing 38. Further, the TFP process includes placing the fibers 30 (i.e., second-end fibers 42) directly around the second bearing 46. As such, the fibers 30 (i.e., the first-end fibers 34) completely surround the first bearing 38, and other fibers 30 (i.e., the second-end fibers 42) completely and continuously surround the second bearing 46. Next, as shown in FIGS. 6-9, the TFP process includes placing fibers 30 (e.g., shank fibers 32) between the first bearing 38 and the second bearing 46. For example, at least some of the fibers 30 may be wrapped around the first bearings 38, then extend toward the second bearing 46, and finally wrapped around the second bearing 46. As shown in FIGS. 7-9, at least one of the fibers 30 is not wrapped around the first bearing 38 or the second bearing 46. Rather, this fiber 30 (i.e., one of the shank fibers 32) is merely placed between the first bearing 38 and the second bearing 46. Each of the six layers 50 would be stitched together with a stitching yarn. The stitching yarn is smaller than the bundles of fiber (such as bundles of carbon fiber) and are just there to hold all of the fibers 30 in place.

Figure 13:
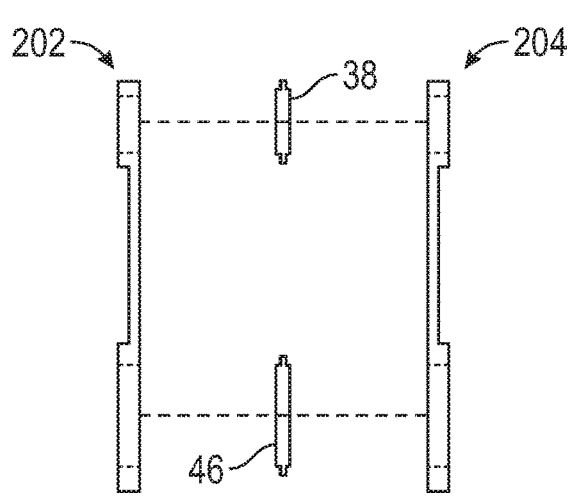
FIG. 13 is a schematic illustration, depicting bearings disposed between halves of a connecting rod.
Figure 14:
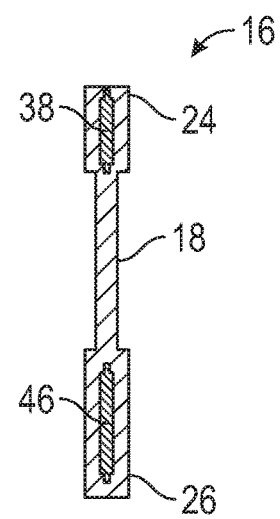
FIG. 14 is a schematic side view of the connecting rod.

With reference to FIGS. 13 and 14, the method 100 may include forming a first half 202 of the connecting rod 16 and forming a second half 204 of the connecting rod by placing the fibers in the predetermined arrangement (i.e., block 102 in FIG. 12). Then, as shown in FIG. 14, the first bearing 38 and the second bearing 46 are sandwiched with the first half 202 of the connecting rod 16 and the second half 204 of the connecting rod 16 to assemble the connecting rod 16. Then, the resin is infused to the first half 202 of the connecting rod 16 and the second half 204 of the connecting rod 16.

Figure 15:
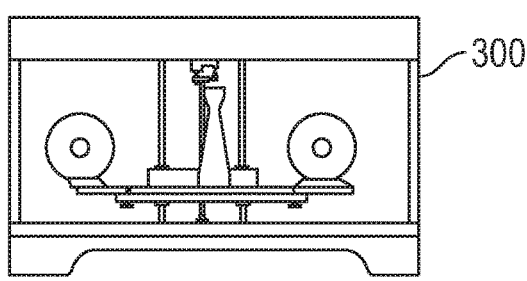
FIG. 15 is a schematic front view of a 3D printer.

With reference to FIG. 15, the method 100 may entail using a 3D printer 300 to place the plurality of fibers 30 in a predetermined arrangement (i.e., block 102 in FIG. 12), and to add the resin to the plurality of fibers 30 to connect the fibers 30 together to thereby form the connecting rod 16 (i.e., block 104 in FIG. 12). In other words, placing the fibers 30 in the predetermined arrangement (i.e., block 102) and adding the resin are performed in a single step using a 3D printing process. By employing this 3D printing process, no resin infusion is required to form the connecting rod 16.

Figure 16:
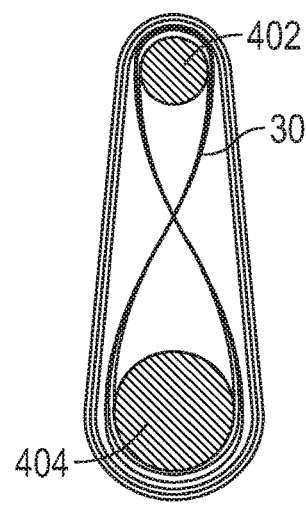
FIG. 16 is a schematic illustration of a method for placing the fibers in a predetermined arrangement.

With reference to FIG. 16, in the method 100, placing the plurality of fibers 30 in the predetermined arrangement (i.e., block 102 in FIG. 12) may entail wrapping fibers 30 around a first mandrel 402 and a second mandrel 404 to allow high-speed manufacturing of the connecting rod 16. In other words, placing the fibers 30 in the predetermined arrangement (i.e., block 102 in FIG. 12) may include wrapping fibers 30 around two mandrels (i.e., the first mandrel 402 and the second mandrel 404). The location and size of the first mandrel 402 corresponds to the location of the first bearing 38 of the connecting rod 16, and the location and size of the second mandrel 404 corresponds to the location and size of the second bearing 46. Accordingly, the second mandrel 404 is larger than the first mandrel 402 in order to manufacture the connecting rod 16 capable of being connected to the pistons 12 and the crankshaft 14 as described above.

Figure 17:
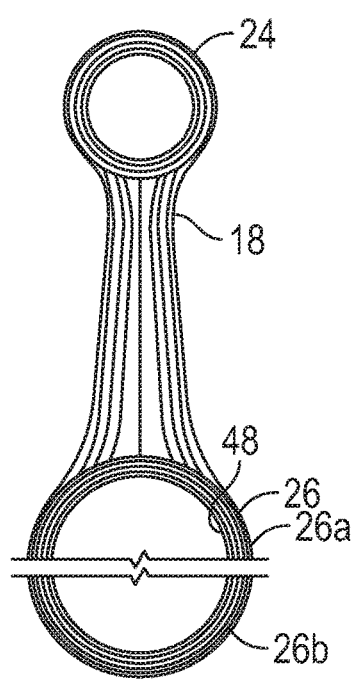
FIG. 17 is a schematic front view of the connecting rod while a second end portion is being cut.
Figure 18:
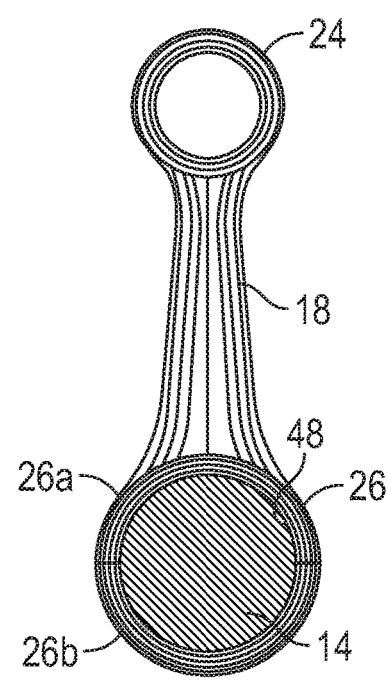
FIG. 18 is a schematic front view of the connecting rod while the second journal bearing is placed within the second end portion.
Figure 19:
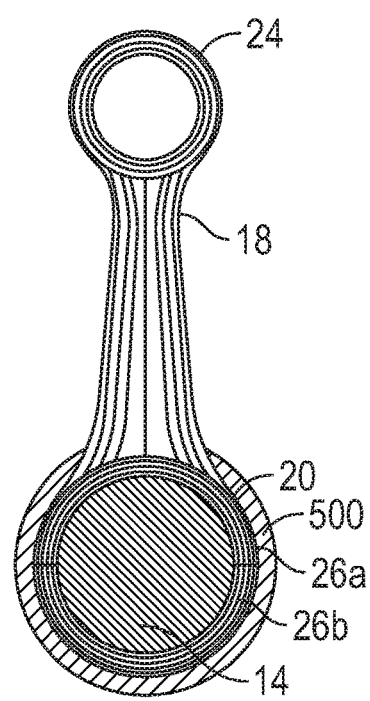
FIG. 19 is a schematic front view of the connecting rod while a cap is coupled to the second end portion to couple the second bearing to the second end portion.

With reference to FIGS. 17-19, after manufacturing the connecting rod 16 as set forth in method 100, the second end portion 26 may be cut to divided in half as shown in FIG. 17. Accordingly, the second end portion 26 is divided into two pieces, namely the first part 26a and the second part 26b. Then, as shown in FIG. 18, the bearing crankshaft 14 (shown in FIG. 1) is inserted in the second cavity 48 of the second end portion 26. In this method, a journal bearing may be used instead of a roller bearing. Accordingly, the connecting rod 16 may include a journal bearing coupled to the first end portion 24 and/or the second end portion 26. Next, a cap 500 is coupled to the first part 26a and the second part 26b to assemble the second end portion 26 with the second bearing 46. The cap 500 may be wholly or partly made of a metallic or composite material. The cap 500 may be mechanically fastened or bonded to the second end portion 26 of the connecting rod 16. Although FIGS. 17-19 schematically illustrated a split version of the connecting rod 16, it is contemplated the presently disclosed connecting rod 16 may also be a non-split version.

Figure 20:
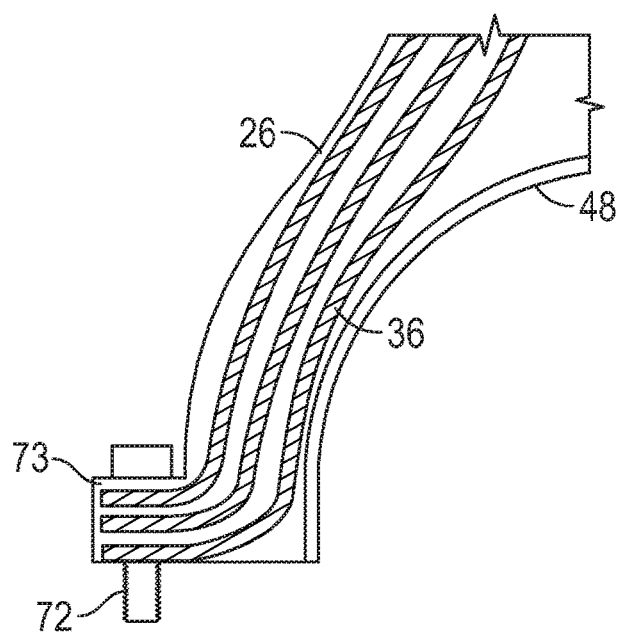
FIG. 20 is a schematic front view of a portion of the connecting rod, depicting a spit bearing design with a flange.

With reference to FIG. 20, in the spit version of the connecting rod 16, the TFP process may be used to enable a split bearing design with one or more fastener 72. The fastener 72 extends through a flange 73 of the connecting rod 16. The fibers 30 can follow the complex curves of the connecting rod 16 (e.g., the complex curves of the second end portion 26). The connecting rod 16 can be manufactured with weak zones wherein the fibers 30 come together (i.e., at the split). Then, the second end portion 26 is cut or etched in a scratch or groove. Next, stress is applied to crack the two halves of the second end portion 26 apart guided by the scratch/weak zone. At this point, the two halves of the second end portion 26 can be easily separated, and the metallic bearing surfaces can now be applied. As non-limiting examples, the fasteners 72 could be dowels, bolts, sleeves, etc. and could be embedded between the first part 26a and the second part 26b (FIG. 17) of the second end portion 26.

Figure 21:
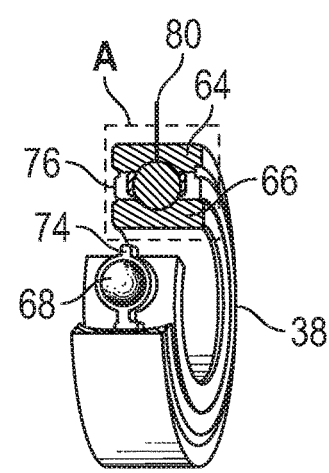
FIG. 21 is a schematic cross-sectional isometric view of a bearing.

With reference to FIG. 21, as discussed above, each of the first bearing 38 and the second bearing 46 includes the outer race 64 (i.e., outer ring), the inner race 66 (i.e., the inner ring), a plurality of rollers 68 disposed between the outer race 64 and the inner race 66, and a cage 74 surrounding the rollers 68. Each of the first bearing 38 and the second bearing 46 may include a pair of metal shield 76 on opposite sides of the rollers 68.

With reference to FIGS. 23-27, the method 100 may entail filling the bearing (i.e., the first bearing 38 and/or second bearing 46) with a removable material 78. Specifically, the cage 74 (which supports the rollers 68) can be filled with the removable material 78. The removable material may also be referred to as the sacrificial material and may be wholly or partly made meltable or vaporizing materials. As non-limiting examples, "meltable or vaporizing materials" are polymers, waxes, and metals that melt and/or vaporize at a lower temperature than the resin of the matrix 28 (FIG. 2). If meltable or vaporizing materials are used in this process, the resin may be wholly or partly made of thermosets, such as epoxies, phenolic, polyurethanes, polyesters, bis-maleimides (BMIs), polyimides, benzoxazines, and the fibers 30 are wholly or partly made of carbon, basalt, and/or glass. Alternatively or additionally, the removable material may be wholly or partly made of depolymerizable or degradable materials, such as polymers, metals, and ceramics. "Depolymerizable or degradable materials" are polymeric materials that can undergo depolymerization (or that can degrade) to revert the materials to their monomers at relatively low temperatures such as room temperature. If depolymerizable or degradable materials are used in this process, the resin may be wholly or partly made of thermoplastics, such as polyamides, polyethylenes, and/or polypropylenes, and the fibers 30 can be wholly or partly made of polymeric materials such as aramids, and ultra-high-molecular-weight polyethylene (UHMPE), or a combination thereof. The removable materials may be wholly or partly made of dissolvable materials. "Dissolvable materials" are salts, waxes, or plastic that can dissolve when exposed to a solution, such as an aqueous solution.

Figure 22:
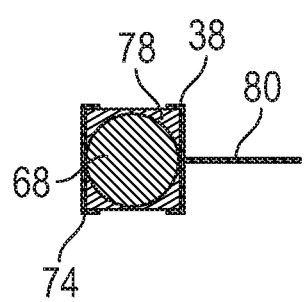
FIG. 22 is a schematic cross-sectional front view of a bearing, taken around area A of FIG. 21, including removable material therein.
Figure 23:
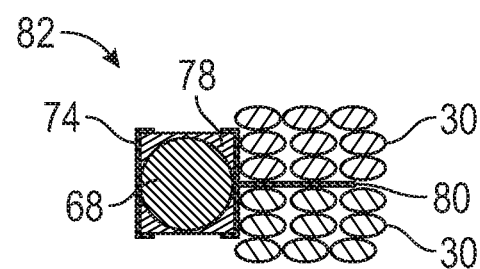
FIG. 23 is a schematic cross-sectional front view of the bearing, including removable material therein, and fibers.
Figure 24:
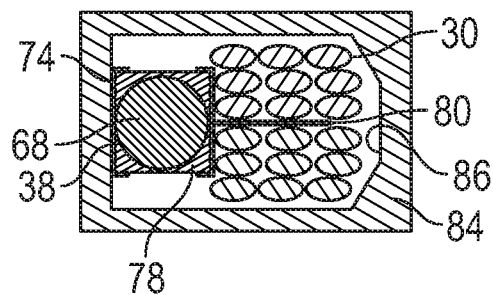
FIG. 24 is a schematic cross-sectional front view of a preform, which includes the bearing, removable material and fibers, in a mold.
Figure 25:
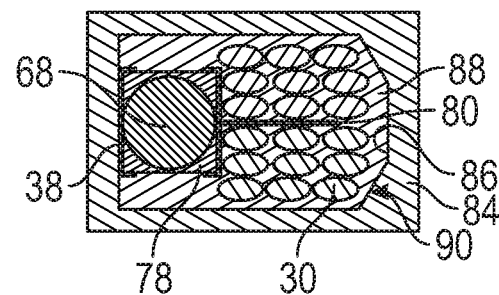
FIG. 25 is a schematic cross-sectional front view, depicting resin being added to the preform to form a part.
Figure 26:
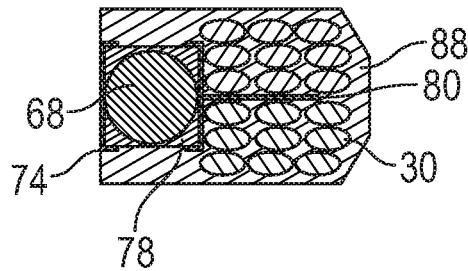
FIG. 26 is a schematic cross-sectional front view of the part shown in FIG. 25 being removed from the mold.
Figure 27:
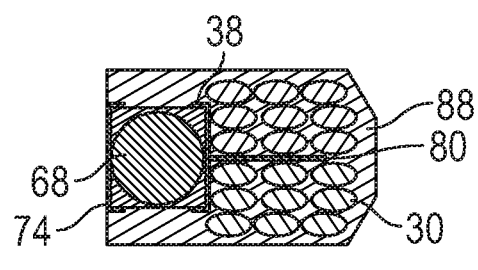
FIG. 27 is a schematic cross-sectional front view of the part shown in FIG. 25 without the removable material.

As shown in FIG. 22, the bearing (i.e., the first bearing 38 and/or second bearing 46) includes a fin 80 protruding from the cage 74. The fin 80 is configured to support the fibers 30 and includes a first fin surface 92 and a second fin surface 94 (see FIG. 4). After filling the bearing (i.e., the first bearing 38 and/or second bearing 46) with the removable material 78, the fibers 30 are placed along the bearing to form the preform 82. In the present disclosure, the term "preform" includes the bearing and the fibers 30 assembled together as shown in FIG. 23. Specifically, the fibers are placed along the fin 80. Once the preform 82 is formed, the preform 82 is placed in a mold cavity 86 a mold 84 as shown in FIG. 24. Then, the resin 88 is infused into the mold 84 using a resin transfer molding process as shown in FIG. 25. The resin transfer molding process includes transferring the resin into the mold cavity 86 of the mold 84 to form a part 90. Next, the resin 88 is cured to couple the fibers 30 to the bearings. After curing, the part 90 is removed from the mold 84 as shown in FIG. 26. Next, the removable material 78 is removed from the bearing the method further includes removing the removable material from the bearing (i.e., the first bearing 38 and/or second bearing 46) to form the connecting rod 16. As discussed above, the removable material 78 may be removed from the bearing by melting, vaporizing, degrading, depolymerizing, and/or dissolving the removable material.

With reference to FIGS. 28-32, the method 100 may entail using a sealed bearing (i.e., the first bearing 38 and/or second bearing 46). Sealed bearing cannot be filled with the removable material as shown in FIG. 28. In this method 100, the fibers 30 are placed along the bearing to form the preform 82 as shown in FIG. 29. Specifically, the fibers are placed along the fin 80. Once the preform 82 is formed, the preform 82 is placed in a mold cavity 86 a mold 84 as shown in FIG. 30. Then, the resin 88 is infused into the mold 84 using a resin transfer molding process as shown in FIG. 31. The resin transfer molding process includes transferring the resin into the mold cavity 86 of the mold 84 to form a part 90. Next, the resin 88 is cured to couple the fibers to the bearing. After curing, the part 90 is removed from the mold 84 as shown in FIG. 26. The methods described in this disclosure can also be used to make other linkages such as steering linkages, suspension linkages, shift linkages, bike components, etc.

The method of manufacturing a connecting rod may include placing a core material between the two halves. This core would function to add bending stiffness to the composite conrod. Alternatively, rather than use a core, a removable material is used to form a hollow section between the two halves. In either case, the removable material or the core is placed between the two halves in the shank section of the connecting rod. The core/removable-material could be completely or partially surrounded by fibers. The resin is then added and cured to form the composite. In the case of the removable material, the material is then removed to form a hollow region While the best modes for carrying out the disclosure have been described in detail, those familiar with the art to which this disclosure relates will recognize various alternative designs and embodiments for practicing the disclosure within the scope of the appended claims.

What is claimed is:

1. A connecting rod, comprising:
    a shank extending along a shank axis;
    a first end portion coupled to the shank, wherein the first end portion has an annular shape, the first end portion defines a first inner surface, the first inner surface has an annular shape, and the first inner surface has a first circumference;
    a second end portion coupled to the shank, wherein the second end portion has an annular shape;
    wherein each of the shank, the first end portion, and the second end portion includes a fiber-reinforced composite;
    wherein the fiber-reinforced composite includes a matrix and a plurality of fibers embedded in the matrix;
    wherein the plurality of fibers includes shank fibers disposed in the shank;
    wherein at least one of the shank fibers is elongated along the shank axis;
    wherein the plurality of fibers includes a plurality of first-end fibers, the plurality of first-end fibers includes a first annular fiber, and the first annular fiber has an annular shape such that the first annular fiber continuously surrounds an entirety of the first circumference of the first inner surface of the first end portion; and, further comprising a second bearing, the second bearing includes an outer race, an inner race, and a plurality of rollers disposed between the outer race and the inner race; and
    wherein the second bearing includes a fin protruding from the outer race, the fin is configured to support the plurality of fibers, the fin has a first fin surface and a second fin surface opposite the first fin surface.

2. The connecting rod of claim 1, wherein the first-end fibers extend annularly within the first end portion, and at least one of the first-end fibers entirely and continuously surrounds an entirety of the first circumference of the first inner surface, the connecting rod further comprising a first bearing, the first inner surface defines a first cavity, and the first cavity receives the first bearing, and all of the fibers disposed in the shank are oriented at an angle that is between zero degrees and twenty-five degrees.

3. The connecting rod of claim 2, wherein the second end portion defines a second inner surface, the second inner surface has an annular shape, the second inner surface has a second circumference, the plurality of fibers includes a second-end fiber that has an annular shape to continuously surround an entirety of the second circumference of the second inner surface.

4. The connecting rod of claim 3, further comprising over-braiding surrounding the shank.

5. The connecting rod of claim 4, wherein the second inner surface defines a second cavity, and the second cavity receives the second bearing, the second cavity is larger than the first cavity, and the second circumference is greater than the first circumference.

6. The connecting rod of claim 5, wherein the plurality of fibers includes a plurality of layers that are stacked together, each of the plurality of layers includes the fibers such that the plurality of fibers are stacked together, the plurality of layers includes a first outermost layer, a second outermost layer opposite the first outermost layer, the first outermost layer is a first layer, and a plurality of intermediate layers disposed between the first outermost layer and the second outermost layer, the plurality of intermediate layer includes a second layer, a third layer, a fourth layer, and a fifth layer, the second outermost layer is a sixth layer, the second bearing includes an outer race, an inner race, and a plurality of rollers disposed between the outer race and the inner race, the first outermost layer and the second outermost layer are closer to the inner race than the intermediate layers, thereby overlapping the second bearing to lock the second bearing in place.

7. The connecting rod of claim 1, further comprising at least one journal bearing coupled to at least one of the first end portion and the second end portion.

8. The connecting rod of claim 1, wherein the connecting rod has a split bearing design in one of the first end portion or the second end portion, and the fibers are oriented to form a flange with a resin rich line.

9. The connecting rod of claim 1, further comprising a plurality of layers, wherein each of the first end portion and the second end portion includes more of the plurality of layers than the shank, four of the plurality of layers are stacked together at the shank, and six of the plurality of layers are stacked together at each of the first end portion and the second end portion.

10. A connecting rod, comprising:
    a shank extending along a shank axis;
    a first end portion coupled to the shank, wherein the first end portion has an annular shape, the first end portion defines a first inner surface, the first inner surface has an annular shape, and the first inner surface has a first circumference;
a second end portion coupled to the shank, wherein the second end portion has an annular shape;
wherein each of the shank, the first end portion, and the second end portion includes a fiber-reinforced composite;
wherein the fiber-reinforced composite includes a matrix and a plurality of fibers embedded in the matrix;
wherein the matrix includes a resin, and the resin is wholly made of at least one chosen from thermosets, epoxies, phenolic, polyurethanes, polyesters, bis-maleimides (BMIs), polyimides, benzoxazines, thermoplastics, polyamides, polyethylene, polypropylene, or ceramics;
wherein the plurality of fibers includes shank fibers disposed in the shank; and
wherein at least one of the shank fibers is elongated along the shank axis;
wherein all of the shank fibers are oriented at a shank fiber angle relative to the shank axis that is between zero degrees and twenty-five degrees;
wherein the plurality of fibers includes a plurality of first-end fibers, the plurality of first-end fibers includes a first annular fiber, and the first annular fiber has an annular shape such that the first annular fiber continuously surrounds an entirety of the first circumference of the first inner surface of the first end portion;
wherein the connecting rod comprises a first bearing, wherein the first inner surface defines a first cavity, and the first cavity receives the first bearing, the connecting rod further comprises a second bearing, the second end portion defines a second inner surface, the second inner surface has an annular shape, the second inner surface has a second circumference, the second inner surface defines a second cavity, the second cavity receives the second bearing, the second cavity is larger than the first cavity, and the second circumference is greater than the first circumference;
wherein the connecting rod comprises a plurality of layers stacked together, each of the plurality of layers includes the fibers such that the plurality of fibers are stacked together, the plurality of layers includes a first outermost layer, a second outermost layer opposite the first outermost layer, the first outermost layer is a first layer, and a plurality of intermediate layers disposed between the first outermost layer and the second outermost layer, the plurality of intermediate layer includes a second layer, a third layer, a fourth layer, and a fifth layer, the second outermost layer is a sixth layer;
wherein the second bearing includes an outer race, an inner race, and a plurality of rollers disposed between the outer race and the inner race, the first outermost layer and the second outermost layer are closer to the inner race than the intermediate layers, thereby overlapping the second bearing to lock the second bearing in place; and
wherein the second bearing includes a fin protruding from the outer race, the fin is configured to support the plurality of fibers, the fin has a first fin surface and a second fin surface opposite the first fin surface, the first fin surface faces toward the first layer, the second layer, and the third layer, the first fin surface faces away from the fourth layer, the fifth layer, and the sixth layer, the second fin surface faces toward the fourth layer, the fifth layer, and the sixth layer, the second fin surface faces away from the first layer, the second layer, and the third layer, the third layer is closer to the fin than the first layer, the second layer is closer to the fin than the first layer, the fourth layer is closer to the fin than the fifth layer, the fifth layer is closer to the fin than the sixth layer.

11. The connecting rod of claim 10, wherein all of the fibers disposed in the shank are oriented at an angle that is between zero degrees and twenty-five degrees.

12. The connecting rod of claim 11, wherein the first-end fibers extend annularly within the first end portion, and at least one of the first-end fibers entirely and continuously surrounds an entirety of the first circumference of the first inner surface.

13. The connecting rod of claim 12, wherein the plurality of fibers includes a second-end fiber that has an annular shape to continuously surround an entirety of the second circumference of the second inner surface.

* * * * *